W. B. LASHAR.
CHAIN TIRE GRIP.
APPLICATION FILED JAN. 7, 1911.

1,163,619

Patented Dec. 7, 1915.

WITNESSES
Jessie B. Kay
Florence E. Wolfe

Walter B. Lashar INVENTOR
BY
Duncan & Duncan ATTORNEYS

UNITED STATES PATENT OFFICE.

WALTER B. LASHAR, OF BRIDGEPORT, CONNECTICUT, ASSIGNOR TO AMERICAN CHAIN COMPANY, INCORPORATED, OF BRIDGEPORT, CONNECTICUT, A CORPORATION OF NEW YORK.

CHAIN TIRE-GRIP.

1,163,619.    Specification of Letters Patent.    Patented Dec. 7, 1915.

Application filed January 7, 1911.   Serial No. 601,285.

*To all whom it may concern:*

Be it known that I, WALTER B. LASHAR, a citizen of the United States, and resident of Bridgeport, county of Fairfield, and State of Connecticut, have made certain new and useful Inventions Relating to Chain Tire-Grips, of which the following is a specification, taken in connection with the accompanying drawing, which forms part of the same.

This invention relates especially to chain tire grips comprising flexible side members which may be formed with detachable fastening means to readily apply and remove the grip from a vehicle tire and allow the grip to move freely around the tire under service conditions and a series of tread members connected to said side members and consisting largely of hardened, butted, curbed links, the lateral links being unwelded and the central wearing links being, if desired, electrically welded.

Figure 1:
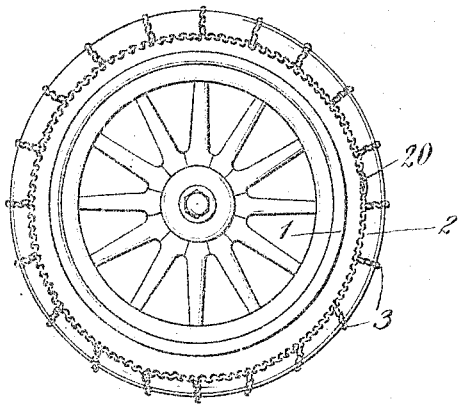
Figure 2:
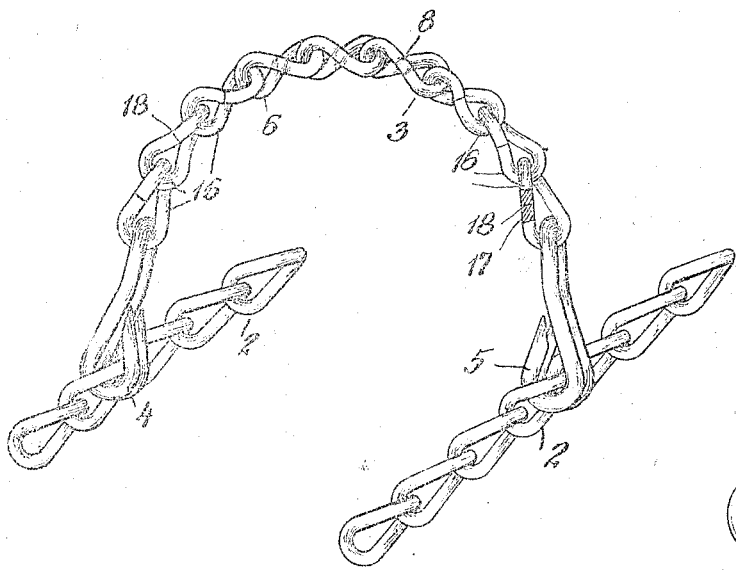
Figure 3:
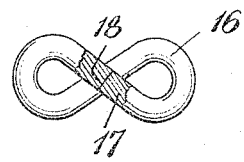

In the accompanying drawing, showing in a somewhat diagrammatic manner, illustrative embodiments of this invention, Figure 1 is an elevation showing a form of grip applied to a wheel. Fig. 2 is an enlarged perspective view showing a tread member and the connected parts of the side members. Fig. 3 is an enlarged view of one form of link, and Fig. 4 is a corresponding view of another form of link.

As indicated in the drawings, the chain grip may comprise flexible side members 2, which may be conveniently formed of chain of any description or of other flexible material, if desired, and which are preferably provided with detachable fastening hooks or means 20 to allow the grip to be readily applied to and removed from the tire of the wheel 1. The tread chains 3 are spaced around the tire at the desired intervals and may be attached to the side members in any desired way so that preferably, they are sufficiently loose as indicated in Fig. 1, to allow the grip to freely travel around the tire under service conditions. Each tread member is preferably largely composed of hardened steel, curbed chain links, which may be attached to the side members by similar links, if desired, or be attached thereto by special attaching links or means 4, 5. With such special attaching means as indicated in Fig. 2, the tread chains may be separately made and sold and if the attaching links are left comparatively soft such separate tread chains may be conveniently attached to the side members, as for instance, when it is desired to replace broken or worn treads.

The curbed chain links which form the larger part of each tread member are preferably formed of suitable high carbon steel or other special hardening steel or material such for instance as chrome steel and suitably hardened or tempered to secure the desired high degree of rigidity of the links, it being of course understood that similarly hard rigid links may be secured by case hardening the lower or softer steels. The curbed links may, if desired, be formed as indicated in Fig. 3 in which the butted ends 17, 18, of the material of which the link 16 is composed are preferably located intermediate and substantially midway between the ends of the link. In this way when the links are hardened they are given sufficient rigidity so that the ends 17, 18, are held in substantial alinement and separation and other distortion prevented under service conditions. This may be promoted by forming the ends of the link material with suitable interlocking or interengaging projections and depressions which may, if desired, be given a substantially conically interlocking form as indicated in Fig. 4. The end 7 of the link material is in the form of a conical projection and the corresponding conical recess 8 in the other end of the link material coöperates therewith so as to effectively hold the parts in alinement when hardened. Also, if desired, the cross section of material at the interlocking or plain butted link ends may be increased as indicated and this joint may with good results, be formed intermediate or midway between the ends of the links 6. When these links have been formed and curbed they may be hardened in any desired way and then, if desired, the central links of each tread member which are of course exposed to the greatest wear, may with good results, be welded in any desired way, as by an electric welding machine which may simultaneously weld the desired member of the central wearing links of each tread chain; the operation being effected quickly enough to prevent softening the entire link or, if desired, the links may be hardened after this welding has been effected.

Figure 4:
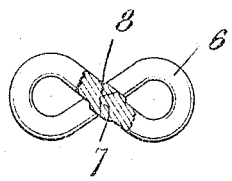

As indicated in Fig. 2, the three lateral links 16 on each side of the tread chain adjacent the special fastening hooks 4, 5 may be formed of such hardened, unwelded, butted, curbed links and as illustrated, the three central wearing links 6 may have their butted ends welded and if desired, given a slightly increased cross section at the points of weld 8, as indicated in Figs. 2 and 4. It is of course understood that any desired number of the wearing links of the tread chains may be welded and that the lateral unwelded links may be provided with interlocking ends, if desired, in order to insure greater rigidity and wearing qualities.

Having described this invention in connection with a number of illustrative embodiments, proportions, sizes, shapes, and materials of parts, to the details of which disclosure the invention is not of course to be limited, what is claimed as new and what is desired to be secured by Letters Patent is set forth in the appended claims.

1. The tire grip comprising tread members and connected chain side members formed with detachable fastening means to readily apply and remove the grip from a vehicle tire and allow the grip to move freely around the tire under service conditions, said tread members comprising attaching links at either end of the same attaching them to the side members and being otherwise formed of hardened steel curbed links, the ends of the link material coming together adjacent the middle of each link, the central wearing links of said tread members being electrically butt welded and the lateral links having substantially conically interlocking ends to assist in preventing distortion of the links.

2. The tire grip comprising tread members and connected flexible side members formed with detachable fastening means to readily apply and remove the grip from a vehicle tire and allow the grip to move around the tire under service conditions, said tread members comprising attaching means at either end of the same attaching them to the side members and being otherwise formed of hardened, curbed links formed of material having meeting ends intermediate the ends of the links, the central wearing links of said tread members being welded and the lateral links having interlocking ends to assist in preventing distortion.

3. The tire grip comprising tread members and connected flexible side members formed with fastening means to apply and remove the grip from a vehicle tire, said tread members being largely formed of hardened steel, curbed links, the central wearing links of said tread members being welded and the lateral links being unwelded, hardened steel, butted, curbed links.

4. The tire grip comprising tread members and connected flexible side members formed with fastening means to apply and remove the grip from a vehicle tire, said tread members comprising curbed links having electrically welded, butted ends and comprising lateral unwelded, curbed links having butted ends.

5. The chain tread member for a tire grip comprising attaching links at either end of the same for attaching it to the side members of a grip and being otherwise formed of hardened steel, curbed links, the ends of the link material coming together intermediate the ends of each link, the central wearing links of said tread member being electrically butt-welded and the lateral links having substantially conically interlocking ends to assist in preventing distortion of the links.

6. The chain tread member for tire grips largely formed of hardened steel, curbed links, the central links of said tread member being electrically welded and the lateral curbed links being hardened and provided with interlocking ends to assist in preventing distortion of the links.

WALTER B. LASHAR.

Witnesses:
 HARRY L. DUNCAN,
 JESSIE B. KAY.